US007941967B2

(12) United States Patent
Jolley

(10) Patent No.: US 7,941,967 B2
(45) Date of Patent: May 17, 2011

(54) METHOD OF PRODUCING ORNAMENTAL TREE USING VINE PLANTS

(76) Inventor: Wesley B. Jolley, Loxahatchee, FL (US)

( * ) Notice: Subject to any disclaimer, the term of this patent is extended or adjusted under 35 U.S.C. 154(b) by 0 days.

(21) Appl. No.: 12/657,073

(22) Filed: Jan. 13, 2010

(65) Prior Publication Data

US 2010/0115838 A1    May 13, 2010

Related U.S. Application Data

(63) Continuation-in-part of application No. 11/501,539, filed on Aug. 9, 2006, now abandoned.

(60) Provisional application No. 60/709,059, filed on Aug. 17, 2005.

(51) Int. Cl.
*A47G 7/00* (2006.01)

(52) U.S. Cl. .............. 47/39; 47/44; 47/47; 47/66.7

(58) Field of Classification Search ............ 47/39, 42, 47/43, 44, 47, 66.7
See application file for complete search history.

(56) References Cited

U.S. PATENT DOCUMENTS

| 59,197 | A | * | 10/1866 | Dunn | 47/44 |
|---|---|---|---|---|---|
| 1,797,077 | A | * | 3/1931 | Dew et al. | 248/121 |
| D197,291 | S | * | 1/1964 | Monkarsh | D11/151 |
| 4,770,303 | A | * | 9/1988 | Boyd | 211/205 |
| 5,037,049 | A | * | 8/1991 | Funk | 248/165 |
| D387,633 | S | * | 12/1997 | Whalen | D8/1 |
| 6,604,320 | B1 | * | 8/2003 | Hsia | 47/47 |
| 2002/0189163 | A1 | * | 12/2002 | Cooper | 47/39 |
| 2004/0159055 | A1 | * | 8/2004 | Stone | 52/153 |
| 2004/0216372 | A1 | * | 11/2004 | Voogt | 47/39 |
| 2005/0166449 | A1 | * | 8/2005 | Warren | 47/39 |
| 2005/0217170 | A1 | * | 10/2005 | Reeves | 47/39 |
| 2010/0115838 | A1 | * | 5/2010 | Jolley | 47/66.7 |

FOREIGN PATENT DOCUMENTS

FR    2644338 A1 * 9/1990 .............. 47/39

* cited by examiner

*Primary Examiner* — Francis T Palo
(74) *Attorney, Agent, or Firm* — Robert M. Downey, P.A.

(57) ABSTRACT

A method provides the steps of: bending a first length of hot rolled steel bar to define a trunk member of a tree frame; bending and welding second cut lengths of hot rolled steel bar onto a bottom end of the trunk member to define feet members; placing a planting pot on top of the feet members with the trunk member extending up through and above the pot; bending and welding third cut lengths of hot rolled steel bar to the trunk member at spaced intervals above the pot to define branch arms; planting flowering vine plants in the pot and braiding the vines up the trunk member and out onto the branch arms; trimming the vines on the trunk member to remove foliage; and allowing foliage of the flowering vine plants to grow on the branch arms to create the appearance of a giant Bonzai tree.

3 Claims, 4 Drawing Sheets

METHOD OF PRODUCING ORNAMENTAL TREE USING VINE PLANTS

This patent application is a Continuation-In-Part (CIP) of patent application Ser. No. 11/501,539 filed on Aug. 9, 2006, abandoned, which is based on provisional patent application Ser. No. 60/709,059 filed on Aug. 17, 2005.

BACKGROUND OF THE INVENTION

1. Field of the Invention

This invention relates to methods of growing trees on a rigid structure and, more particularly, to a method of growing ornamental trees by cutting, bending and welding hot rolled steel bar segments to form a rigid frame structure and braiding flowering vine plants onto the rigid frame structure and trimming the flowering vine plants to create the appearance of a solid tree trunk having branches with flowering clusters on the branches, thereby creating the appearance of a giant Bonzai tree.

2. Discussion of the Related Art

Some trees and vines have weak or shallow root systems that are unable to provide adequate support as the tree grows larger. Eventually, the top weight of the tree will cause the tree to lean to one side and possibly fall to the ground, particularly in high winds and/or heavy rains. To prevent this, one or more stakes are driven into the ground and tied to the trunk or stem of the tree. In some instances, a single stake or trellis is used directly adjacent to the trunk or growing vines. This is commonly used for bougainvillea trees and bushes. Other staking methods for trees use between 2 and 4 stakes that are driven into the ground at a spaced distance from the base of the tree. The stakes are then tied to the upper trunk of the tree in order to hold the tree in the upright position.

The various staking methods presently used to support weakly rooted trees have several drawbacks and undesirable features. Most notably, presently used staking methods are cumbersome, unsightly and detract from the ornamental appearance of the trees that they support. Also, the staking methods used for supporting trees are not suitable for use at the early growing stages. In most instances, stakes are used after the tree has grown and is planted in the ground Bougainvillea and other weakly rooted trees are often potted with a wood trellis which remains visible at all times, even after the tree is planted in the ground. Eventually, the wooden trellis deteriorates and may break from the weight of the growing tree. Bougainvillea, in particular, will grow large and become top heavy. Eventually, the trellis will be unable to provide adequate support to hold the Bougainvillea plant upright.

Accordingly, their remains an urgent need in the field of nursery and gardening for a permanent underground staking system for vines and weakly rooted trees which is concealed from view, extremely strong, long lasting, and which firmly anchors a fully grown tree in an upright position while withstanding high winds and heavy rains. Moreover, there is a definite need for a system and method for growing flowering vine plants on a rigid, extremely strong steel frame structure to provide highly ornamental trees that are firmly anchored in the ground in which are capable of withstanding high winds and heavy rains.

OBJECTS AND ADVANTAGES OF THE INVENTION

Considering the foregoing, it is a primary object of the present invention to provide a tree growing method using flowering vine plants, such as Bougainvillea, which are grown and braided onto a preformed steel frame structure to create a unique and extremely ornamental tree that can be firmly anchored in the ground and stand in an upright position while withstanding high winds and heavy rain.

It is a further object of the present invention to provide an extremely strong and highly ornamental tree grown from flowering vine plants, such as Bougainvillea, which can be firmly anchored in the ground while concealing a hidden steel bar frame structure thereby presenting the appearance of a solid tree with a wood trunk and branches.

It is still a further object of the present invention to provide a method of producing ornamental trees using flowering vine plants, such as Bougainvillea, which creates the appearance of a giant Bonzai tree.

It is still a further object of the present invention to provide a system and method which allows flowering vine plants, such as Bougainvillea, to grow into highly desirable and ornamental specimen trees, and wherein the ornamental trees include a hidden skeletal support formed of an extremely strong steel bar tree frame structure which allows the ornamental tree to be firmly anchored in the ground with the capability of withstanding high winds and heavy rain.

These and other objects and advantages of the invention are readily apparent with reference to the drawings and the detailed description which follows.

SUMMARY OF THE INVENTION

The present invention is directed to a method of producing ornamental trees using flowering vine plants, and particularly Bougainvillea plants. The method provides the steps of: bending a first length of hot rolled steel bar to define a trunk member of a tree frame; bending and welding second cut lengths of hot rolled steel bar onto a bottom end of said trunk member to define feet members; placing a planting pot on top of the feet members with the trunk member extending up through and above the pot; bending and welding third cut lengths of hot rolled steel bar to said trunk member at spaced intervals above said pot to define branch arms; planting flowering vine plants in the pot and braiding the vines up the trunk member and out onto the branch arms; trimming the vines on the trunk member to remove foliage; and allowing foliage of the flowering vine plants to grow on the branch arms to create the appearance of a giant Bonzai tree.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

The present invention provides a method for producing highly ornamental trees 10 using vine plants. In a preferred embodiment, the method uses the Bougainvillea plant, which is a flowering vine plant. More particularly, three to eight Bougainvillea vine plants are grown on a rigid steel bar tree frame structure 20 that is bent to achieve a desired tree configuration. In the preferred embodiment, the tree configuration resembles a giant Bonzai tree.

Figure 1:
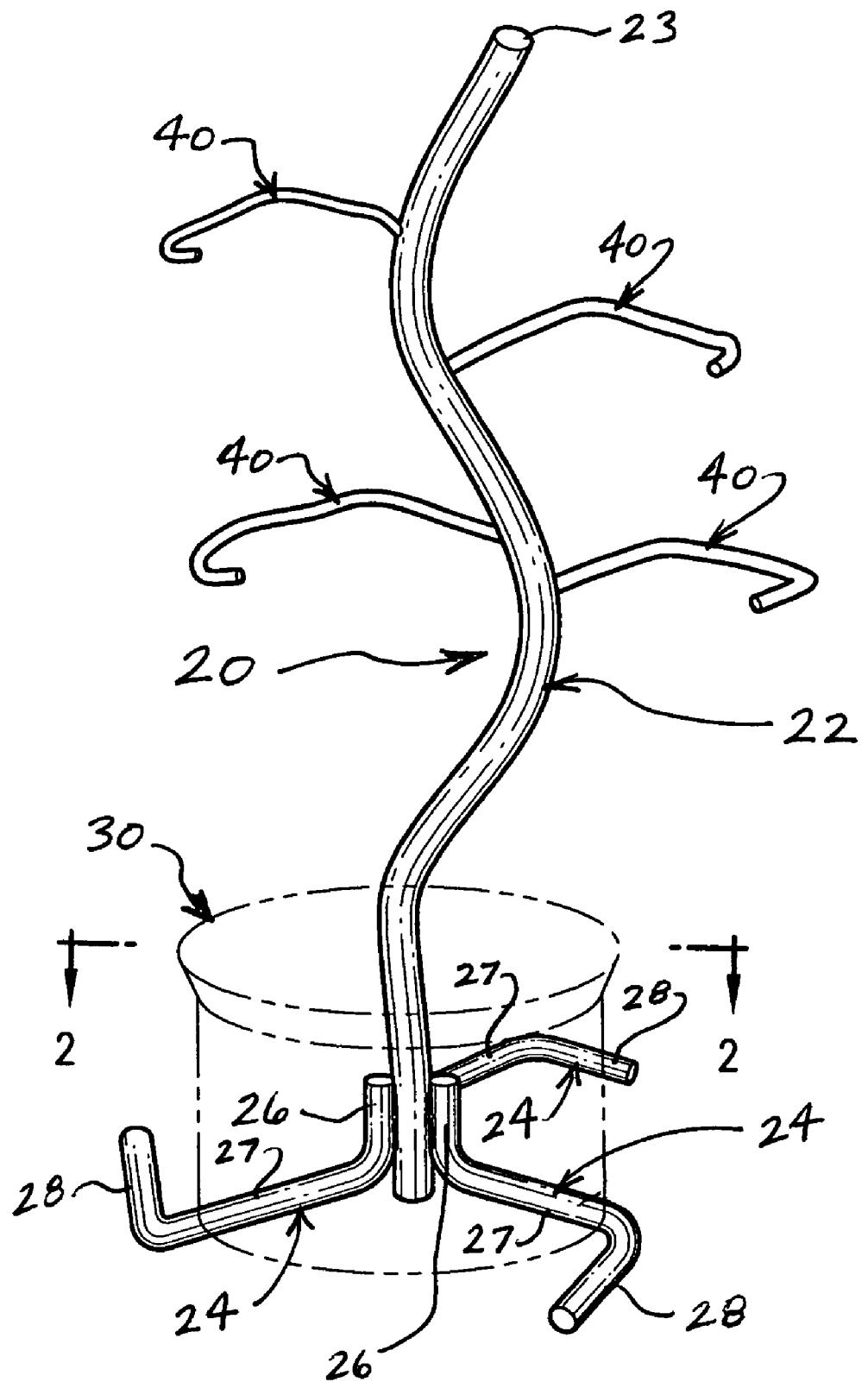
FIG. 1 is a perspective view of the rigid tree frame structure formed in accordance with the method of the present invention using hot rolled steel bar segments, and wherein a planting pot is shown in broken lines.
Figure 2:
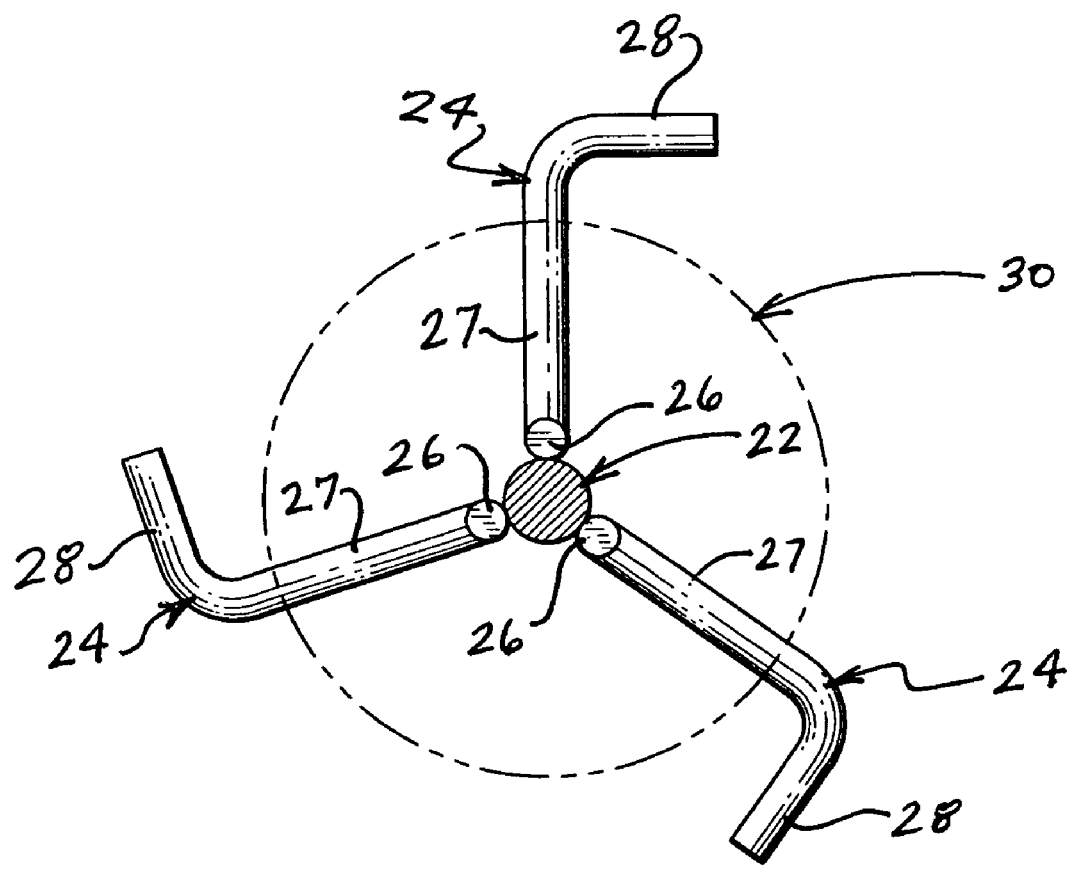
FIG. 2 is a top plan view taken along the plane indicated by the line 2-2 in FIG. 1 and showing the bent configuration of the feet members of the tree frame structure.

Referring initially to FIGS. 1 and 2, the rigid steel bar tree frame structure 20 is shown and is generally indicated as 20. According to the method of the present invention, the tree frame structure 20 is first constructed by cutting lengths of solid hot rolled steel bar to provide a trunk member 22. In a preferred embodiment, the cut length of the trunk member 22 is approximately 4 ft to 8 ft long, depending upon the desired overall tree height. These first cut lengths of steel bar, used for the main trunk members 22, are preferably ¾ of an inch to 1 inch in diameter. The first lengths 22 of steel bar are then bent to a desired configuration, preferably resembling the main trunk of a Bonzai tree. To bend the bar, a MEMOLI bar bending machine is used to exert up to 5,000 pounds per square inch on the hot rolled steel bar that forms the trunk member 22.

Next, three segments of the same ¾ inch to 1 inch diameter hot rolled steel bar are cut and bent using the MEMOLI bar bending machine to the configuration shown in FIGS. 1 and 2. These segments, defining feet members 24, are bent to include a vertical portion 26, a first horizontal portion 27, and a second horizontal portion 28. Each of these three bent feet segments 24 of steel bar are welded to the lower end of the first cut length defining the trunk member 22 as shown, with the vertical portion 26 welded to the trunk member 22. Accordingly, the first cut length, extending upwardly, provides the tree trunk member 22 and the three cut lengths welded to the bottom of the tree trunk member provide feet members 24. The feet members 24 are welded to the main trunk member 22 using an Auto Feed MIG welder.

Next, a plastic planting pot 30 is dropped down over the top end 23 of the main trunk member 22 until the pot 30 rests on top of the feet members 24, as seen in FIG. 1. The planting pot 30 has a hole in the center of its bottom to allow the main trunk member 22 to pass through the hole as the pot drop down the length of the trunk member until it comes to rest on top of the feet members.

Next, several segments of ½ inch to ⅜ inch solid rolled steel bar are cut to provide branch arms 40 of the tree frame structure. Each of the segments of the cut branch arms 40 are bent, using the MEMOLI bar bending machine, to achieve the desired branch configuration. In a preferred embodiment, the branch configuration resembles that of a Bonzai tree. The branch arms 40 are then welded at spaced intervals along the length of the tree trunk member 22 according to the desired tree configuration.

Next, the entire steel frame structure 20 is painted. Initially, a first coat or RUSTOLEUM rusty metal primer is hand painted onto all surfaces of the steel frame structure 20. After drying, a top coat of RUSTOLEUM Hammered Metal paint is hand painted onto all exposed surfaces of the steel frame structure 20, including welded areas.

In a greenhouse or other suitable plant growing facility, six foot tall Bougainvillea vines are grown in three gallon planting pots. The vines are allowed to grow up with the use of 6-8 foot tall bamboo sticks that are seated in the soil of the planting pots. As the vines grow, they are trained to grow up the bamboo sticks. Periodically, the vines are trimmed or clipped to remove unwanted foliage. This helps to create a tree trunk appearance, while also allowing for future braiding of the vines on the steel bar frame structure 20, as described hereinafter.

Figure 3:
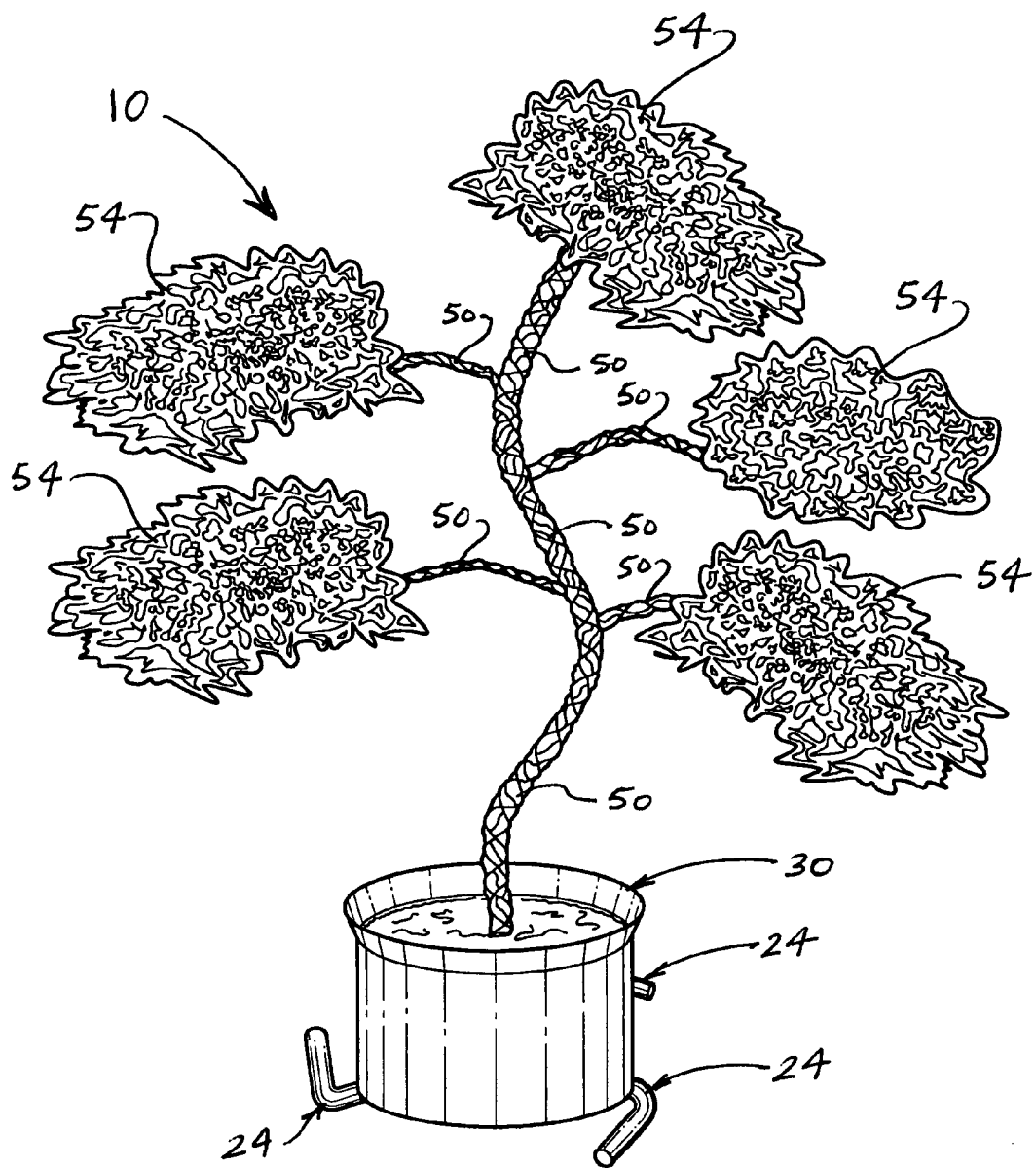
FIG. 3 is a perspective view showing an ornamental tree grown according to the method of the present invention to create the appearance of a giant Bonzai tree.

Next, the six foot tall trimmed vines are transferred from the 3 gallon growing pots to the 10-20 gallon pot 30 that is seated on the base (i.e., the feet members 24) of the steel bar tree frame structure 20, as seen in FIG. 1. Naturally, the pot 30 is filled with potting soil to allow for growth of the root system 52 of the vine plants. After transferring the vines to the pot on the tree frame structure, the vines 50 are braided upwardly on the main upright trunk member 22. The vines 50 are continually braided up the main trunk member 22 of the tree frame structure and out onto the several branch arms 40. As the vines 50 grow, they are continually braided along the main trunk 22 and branch arms 40, by simply wrapping the vines around the steel bar of the frame structure 20. Periodically, the vines 50 are trimmed to remove unwanted foliage, particularly along the length of the main trunk 22. The foliage 54 of the vines 50 is allowed to grow and bloom on the branch arms 40, particularly towards the middle and outboard ends of the branch arms, as shown in FIG. 3. In the preferred embodiment, the Bougainvillea vines are grown and braided onto the tree frame structure 20, with the tree frame structure being bent and formed and the Bougainvillea vines trimmed to create the appearance of a giant Bonzai tree, as shown in FIG. 3. When fully grown, the vines braided up the main trunk member 22 and out onto the several branch arms 40 cover the underlying steel bar frame structure so that the frame structure is hidden from view. In any event, the paint color of the tree frame structure 20 is preferably matched to the wood color appearance of the vines 50 so that if portions of the steel frame structure are exposed, they are not easily visible.

Figure 4:
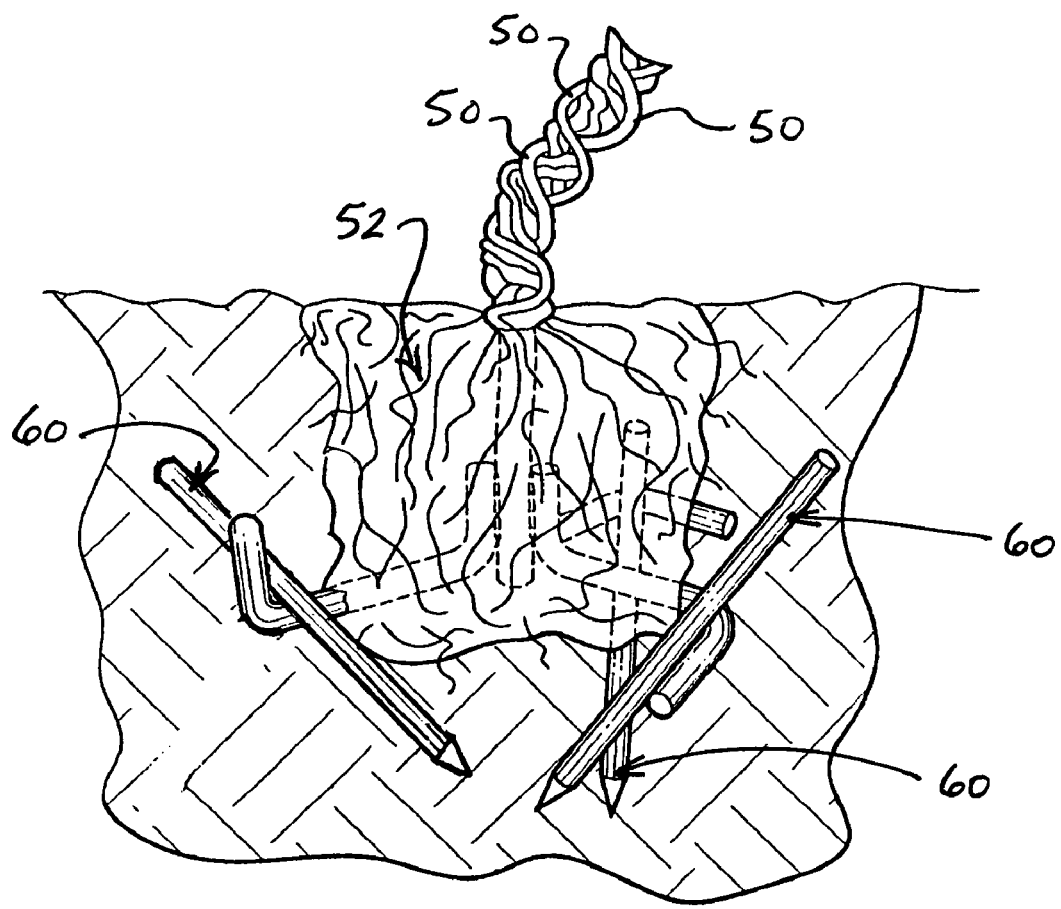
FIG. 4 is an isolated elevational view showing the root system of the ornamental tree of FIG. 3 buried below a ground surface, when the ornamental tree is planted, with stakes driven into the ground at angles and adjacent to the feet members to firmly anchor the tree frame structure in the ground, thereby enabling the tree frame structure to withstand significant lifting, dragging or bending forces.

To plant the ornamental tree 10 in the ground, a hole needs to be dug that is sufficiently large to accommodate the root system 52 of the tree within the planting pot. Next, the planting pot 30 should be split vertically down the sides, and may be removed or left intact on the root system 52. The root system 52 of the tree 10 is then dropped into the hole, with the feet members 24 resting on the bottom of the hole. Next, three stakes 60 are driven into the ground, at the bottom of the hole, and at an angle adjacent to each of the tree feet members 24 to firmly anchor the frame structure 20 in the ground. The angled stakes 60, as seen in FIG. 4, prevent undesirable lifting or shifting of the feet members 24 in response to external forces applied to the tree. The stakes 60 are driven down into the ground so that the top ends of the stakes are well below the ground level. Accordingly, when the hole is filled with soil, to cover the root system 52, the stakes 60 are completely buried and are not visible. When planted in this manner, the tree 10 is extremely sturdy and able to withstand hurricane force winds, heavy rains and other external forces that would normally topple a tree.

Accordingly, the method of the present invention produces a highly ornamental and extremely strong specimen tree that can be firmly anchored in the ground to withstand all types of severe weather conditions. In the preferred embodiment, the method produces an ornamental specimen tree that has the appearance of a giant Bonzai tree, with the use of Bougainvillea vine plants.

While the present invention has been shown and described in accordance with a preferred and practical embodiment thereof, it is recognized that departures from the instant disclosure are fully contemplated within the spirit and scope of the present invention, which is not to be limited, except as defined in the following claims as interpreted under the Doctrine of Equivalents.

What is claimed is:

1. A method of producing an ornamental tree comprising the steps of:
   bending a first length of hot rolled steel bar to define a trunk member of a tree frame;
   bending second lengths of hot rolled steel bar to include a vertical section, a first horizontal section and a second horizontal section;
   welding the vertical section of each of the second lengths to a bottom portion of the trunk member, and the second lengths defining feet members of the tree frame;
   placing a planting pot on top of the feet members with the trunk member extending up through a bottom of the pot and vertically above the pot;
   bending third lengths of hot rolled steel bar to resemble branches of a tree;
   welding the third cut lengths to the trunk member at spaced intervals above the pot to define branch arms of the tree frame;
   filling the planting pot with soil;
   planting flowering vine plants in the pot and braiding vines of the plants upwardly about the trunk member and out onto the branch arms;
   periodically trimming the vines on the trunk member to remove foliage; and
   allowing foliage of the flowering vine plants to grow and bloom on at least a portion of the branch arms.

2. The method as recited in claim 1 further comprising the steps of:
   applying a metal paint primer to all exterior surfaces of the tree frame including the trunk member, the feet members and the branch arms; and
   applying a top coat of metal paint to all exterior surfaces of the tree frame including the trunk member, the feet members and the branch arms.

3. The method as recited in claim 1 further comprising the steps of:
   planting the soil in the planting pot along with a root system of the vine plants and the feet members in a hole dug in the earth;
   driving stakes into the earth within the hole and at an angle relative to the vertical sections of the feet members to hold the feet members anchored within the hole in the earth; and
   filling the hole with soil to completely cover the stakes, the feet members and the root system.

* * * * *